April 14, 1942.   J. KOLBE   2,280,044
MOTOR VEHICLE
Filed March 20, 1939   4 Sheets-Sheet 1
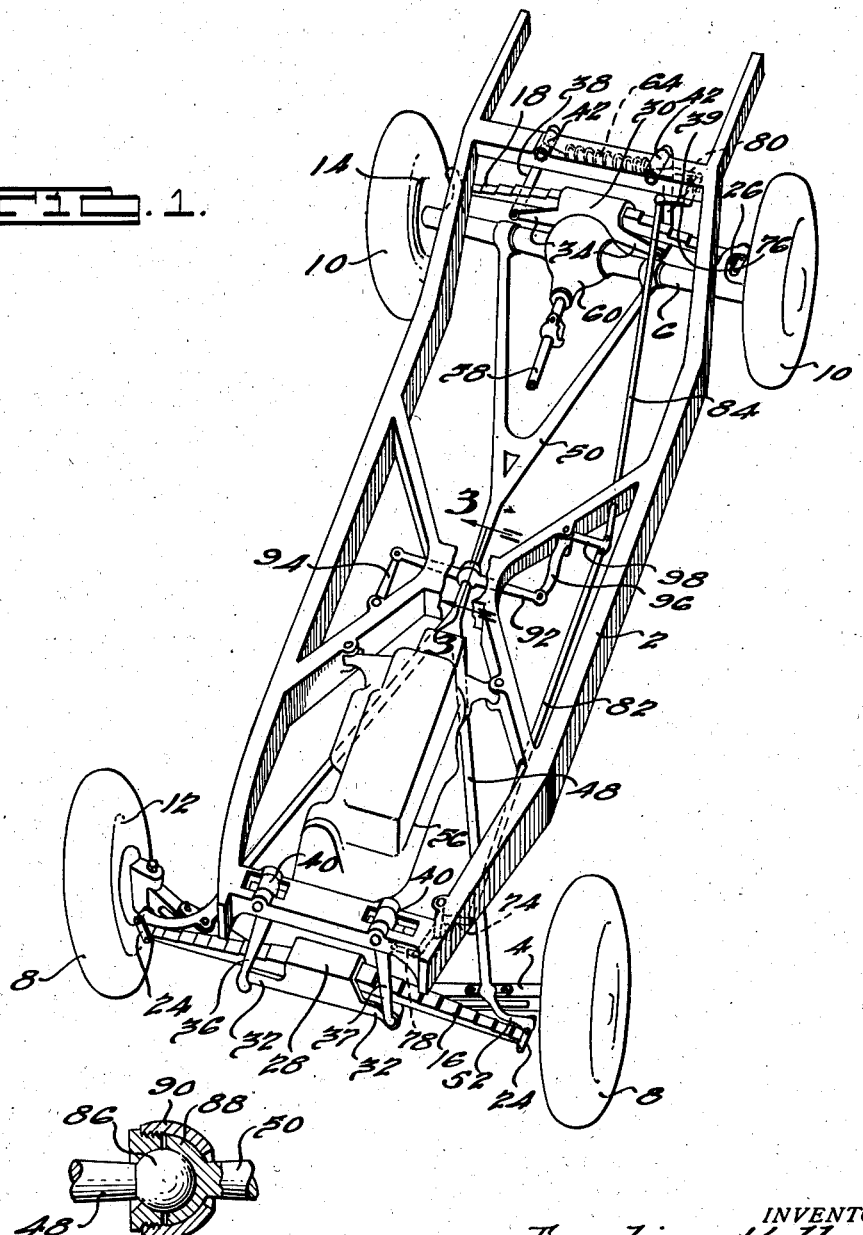
INVENTOR
Joachim Kolbe.
BY Dike Calver & Gray
ATTORNEYS.

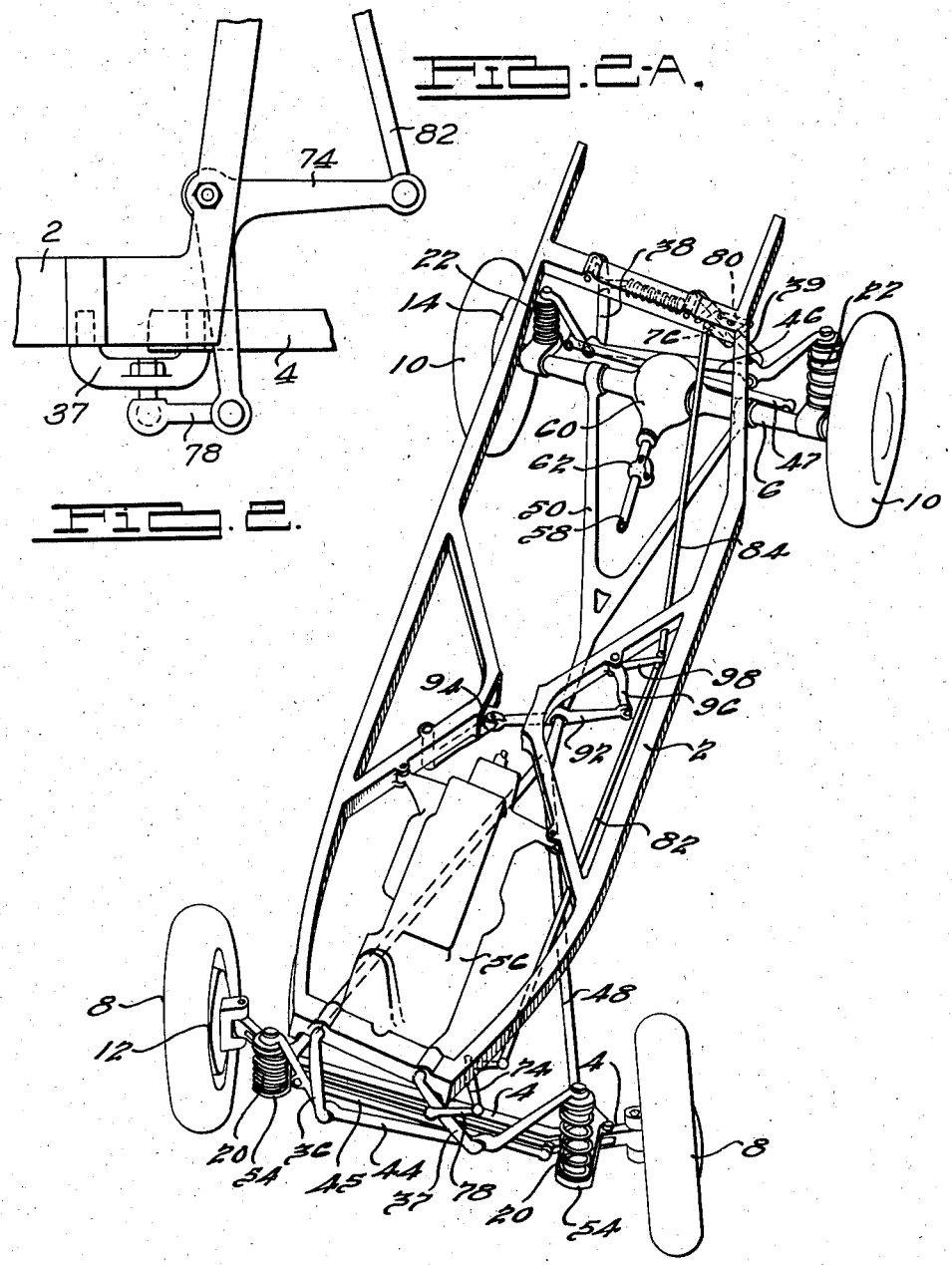

April 14, 1942.  J. KOLBE  2,280,044
MOTOR VEHICLE
Filed March 20, 1939  4 Sheets-Sheet 3
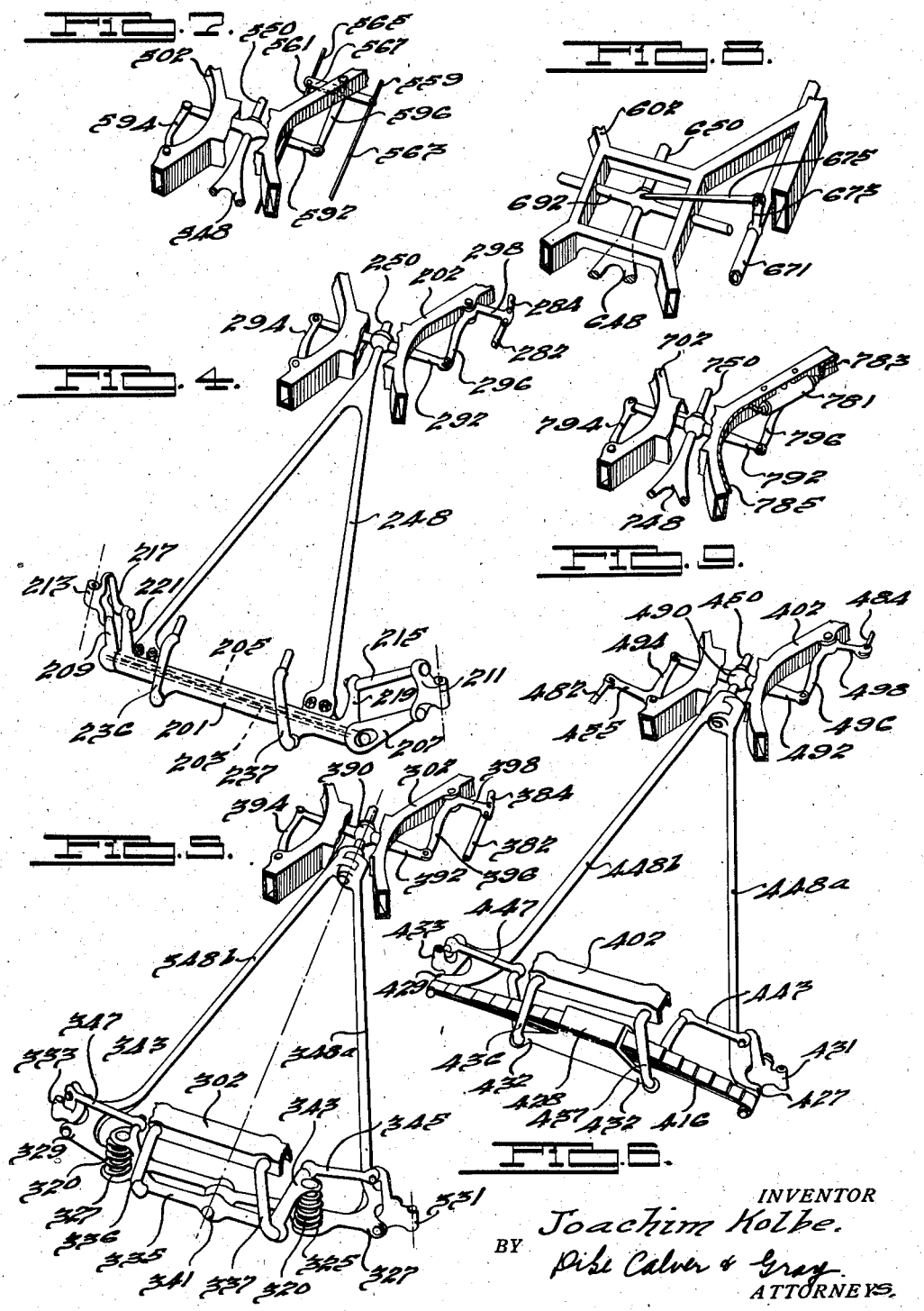
INVENTOR
Joachim Kolbe.
BY Pike Calver & Gray
ATTORNEYS.

April 14, 1942. J. KOLBE 2,280,044
MOTOR VEHICLE
Filed March 20, 1939 4 Sheets-Sheet 4
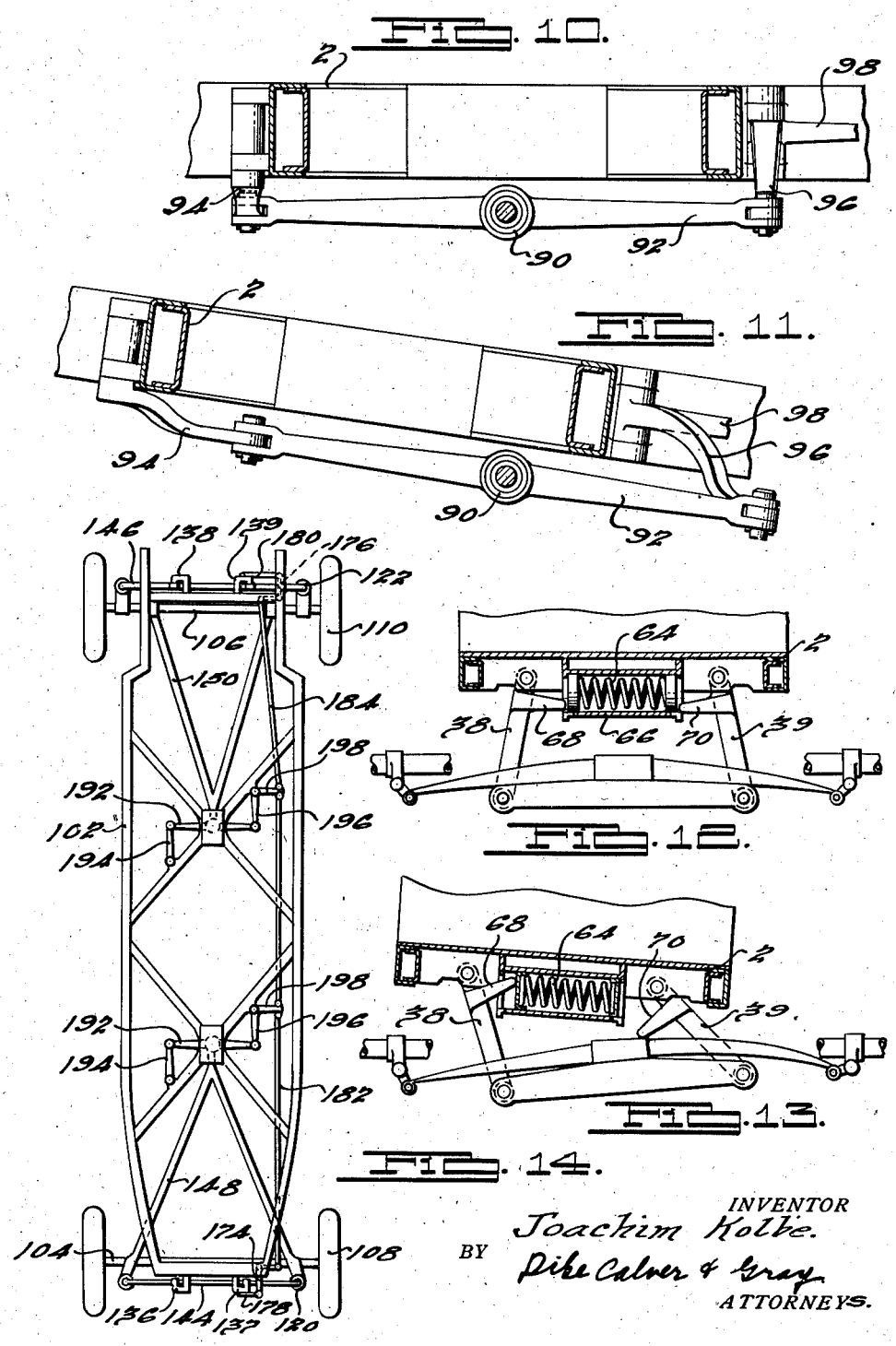

Patented Apr. 14, 1942

2,280,044

UNITED STATES PATENT OFFICE 2,280,044

MOTOR VEHICLE

Joachim Kolbe, Detroit, Mich.

Application March 20, 1939, Serial No. 262,828

22 Claims. (Cl. 280—124)

This invention relates to vehicles, and more particularly to motor vehicles wherein the superstructure or body of the vehicle is so mounted on the wheel supporting means that it may assume an inclined or banked position transversely of the vehicle when traveling around curves.

In vehicles of this type, the superstructure or body must be mounted on the wheel supporting means in such a manner that it is free to swing laterally to an inclined or banked position above the wheel supporting means. In such vehicles it is impractical to attach axle restraining means such for example as links or radius rods to the superstructure to hold the wheel supporting means in position because the superstructure moves relative to the wheel supporting means. In those types of vehicles wherein the superstructure is mounted on resilient or spring means carried by the wheel supporting means, it is necessary to devise some means of restraining the wheel supporting means relative to the superstructure in such a manner that the lateral displacement of the superstructure will not interfere with the restraining means.

In certain types of banking arrangements it is desirable that the superstructure of the vehicle move downwardly relative to the wheel supporting means as it moves into the inclined or banked position. To avoid building the superstructure high relative to the wheel supporting means, it is desirable to provide a restraining means for the wheel supporting means which also moves downwardly as the superstructure of the vehicle moves into an inclined or banked position.

An object of this invention is to provide an improved vehicle having novel suspension means whereby the superstructure may move to an inclined or banked position accompanied by a lowering of the center of gravity under the influence of centrifugal force.

Another object of this invention is therefore to provide means associated with the superstructure and movable relative thereto to support guide means such as radius rods which hold the wheel supporting means or axles in proper relation relative to each other as the superstructure is moved to an inclined or banked position.

A further object is to provide supporting means to maintain the wheel supporting means in proper relation when the superstructure of the vehicle is moved to an inclined or banked position.

A still further object of the invention is to provide novel vehicle suspension means having improved motion transmitting means interconnecting the body or superstructure banking linkage at the front and rear of a vehicle whereby the superstructure will be inclined laterally throughout its length at a substantially constant angle relative to the wheel supporting means.

Yet a further object of the invention is to provide a vehicle suspension system wherein relatively movable means associated with the superstructure and interposed between the wheel supporting means or axles are employed to hold the wheel supporting means or axles in proper relation relative to each other when the superstructure is moved to an inclined or banked position.

Another object resides in the provision of a novel suspension system having motion transmitting mechanism interconnecting remotely spaced means for banking the superstructure of a vehicle relative to the wheel supporting means, such mechanism functioning to displace a supporting means for axle restraining radius rods relative to the superstructure to maintain the supporting means in a constant relation relative to the wheel supporting means as the superstructure assumes an inclined or banked position.

Yet a further object of the invention resides in the provision of an improved vehicle suspension mechanism embodying resilient means to move the body or superstructure back to the normal or upright position as the forces inducing it to move to an inclined or banked position are reduced.

Other objects and advantages of this invention will be apparent from the following detailed description, considered in connection with the accompanying drawings, submitted for purposes of illustration only and not intended to define the scope of the invention, reference being had for that purpose to the subjoined claims.

In the drawings wherein similar reference characters refer to similar parts throughout the several views:

Fig. 1 is a perspective view of a vehicle embodying the present invention;

Fig. 2 is a view generally similar to Fig. 1 but embodying a different type of spring suspension, and showing the body or superstructure supporting means in a banked or angularly inclined position;

Fig. 2A is an enlarged plan view of a portion of the device illustrated in Fig. 2;

Fig. 3 is a sectional view taken substantially on the line 3—3 of Fig. 1;

Fig. 4 is a fragmentary perspective view, partly in section, embodying a modified form of the invention wherein torsion rods are used as springs;

Fig. 5 is a view similar to Fig. 4 embodying a different form of independent wheel suspension;

Fig. 6 is a view similar to Fig. 5 embodying a further modified form of independent wheel suspension;

Fig. 7 is a small fragmentary perspective view illustrating a modified control mechanism;

Fig. 8 is a view similar to Fig. 7 showing a further modified control mechanism;

Fig. 9 is a view similar to Fig. 8, illustrating a fluid pressure operated control mechanism;

Fig. 10 is a sectional view of the control mechanism in the position illustrated in Fig. 1;

Fig. 11 is a view similar to Fig. 10 showing the control mechanism in substantially the position of Fig. 2;

Fig. 12 is a sectional view of the resilient means for returning the body or superstructure to the normal or upright position of Fig. 1;

Fig. 13 is a view similar to Fig. 12 showing the parts substantially in the position illustrated in Fig. 2; and Fig. 14 is a top plan schematic view of a long vehicle such as a bus or truck embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to Fig. 1, a body or superstructure of a vehicle may be mounted on a frame 2, or the frame 2 may be formed as an integral part of the body or superstructure. Front and rear wheel supporting means or axles 4 and 6 may be provided to support front and rear wheels 8 and 10, having front and rear brakes 12 and 14 respectively. It will be understood that the front and rear wheel supporting means may take the form of rigid axles 4 and 6 of the general type illustrated in Figs. 1 and 2 or may take the form of independent wheel suspension means of any desired type, such for example as those illustrated in Figs. 5 and 6.

Resilient means may be interposed between the wheel supporting means and the body or superstructure to cushion or absorb vertical impulses to which the wheels are subjected. Any desired resilient means may of course be employed, such for example as the transverse front and rear leaf springs 16 and 18 of Fig. 1, or the front and rear coil springs 20 and 22 of Fig. 2. If desired, one type of spring suspension may be used at the front of the vehicle and another type at the rear thereof.

In the transverse leaf spring embodiment of Fig. 1, the outer ends of the springs may be connected to the wheel supporting means 4 and 6 by means of front and rear shackles 24 and 26 respectively. Front and rear spring supporting cradles 28 and 30 respectively receive the springs 16 and 18 at substantially the midsections thereof. The cradles 28 and 30 have laterally extending arms 32 and 34 which receive the lower ends of paired angularly inclined front superstructure supporting links 36 and 37, and rear supporting links 38 and 39 respectively. The upper ends of the links 36, 37, 38 and 39 are preferably hingedly connected at 40 and 42 to the frame 2 of the superstructure.

In the embodiment of Fig. 2, transversely extending front and rear members 44 and 46 having upwardly and outwardly extending arms shaped to engage the upper ends of the coil springs 20 and 22, receive the lower ends of the angularly inclined superstructure supporting links 36, 37, 38 and 39.

Means may be provided to maintain the front and rear wheels 8 and 10 of the vehicle in proper lateral alignment relative to the vehicle. One illustrative example of such alignment maintaining means comprises front and rear generally transversely extending cross rods 45 and 47 interconnecting the axles 4 and 6 at one end and the members 44 and 46 at the other end.

Means may be provided to maintain the front and rear wheels 8 and 10 of the vehicle in proper alignment longitudinally of the vehicle. One illustrative embodiment of such an alignment maintaining means comprises front and rear radius rods 48 and 50 respectively bolted or otherwise securely fixed to the front and rear wheel supporting means 4 and 6 respectively. The radius rods are connected, intermediate the front and rear wheels, to novel supporting means carried by the frame 2 of the superstructure and adapted to move relative thereto to lie in the same lateral position relative to the wheel supporting means regardless of variations in the angular position of the superstructure relative to the wheel supporting means.

It will be noted that in the embodiment of Fig. 1, the radius rods 48 are provided with projections 52 which receive the shackles 24 interconnecting the spring 16 and the axle 4. In the embodiment of Fig. 2, the radius rods 48 have forwardly disposed spring supporting members 54 which receive the springs 20.

An engine 56 is mounted in the frame 2 of the superstructure and drives the rear wheels 10 of the vehicle through a propeller shaft 58 interposed between the engine 56 and a differential 60, suitable universal joints such as 62 being interposed between the ends of the propeller shaft 58 and the interconnected parts. It will be understood that if desired the engine 56 may be positioned at the rear of the vehicle to drive either the front or rear wheels and also that if desired the front wheels may be driven in the embodiment illustrated wherein the engine is mounted at the front of the vehicle.

When a vehicle rounds a curve, it is subjected to centrifugal force, which in present day vehicles urges the body or superstructure and the occupants thereof toward the outside of the curve resulting in discomfort to the passengers. The centrifugal force developed is dependent on the speed at which the curve is negotiated, the radius of the curve, and other factors. This centrifugal force results in a transfer of a portion of the weight of the vehicle from the wheels on the inside of the curve to those on the outside of the curve whereby the springs on the outside of the curve are compressed to a greater extent than those on the inside, whereupon the superstructure or body of the vehicle assumes an inclined or banked position, the side of the vehicle on the outside of the curve being lower, which further adds to the discomfort of the occupants of the vehicle.

When a vehicle constructed in accordance with my invention rounds a curve and is therefore subjected to centrifugal force, the superstructure frame 2 moves laterally relative to the wheel supporting means 4 and 6 into an inclined or banked position as illustrated in Fig. 2. It will be observed that during this movement, the front and rear superstructure supporting links 36, 37, 38 and 39 move in the counterclockwise direction, when the vehicle rounds a curve to the left as illustrated in Fig. 2, the links 37 and 39 lowering the superstructure on the inside of the curve, and the links 36 and 38 elevating the superstructure on the outside of the curve. Because of the angularly inclined position of the supporting links in this type of installation, the lowering of the superstructure on the inside of the curve is greater than the raising of the portion of the superstructure on the outside of the curve. The movement of the superstructure to the inclined or banked position therefore results in a lowering of its center of gravity. When a vehicle of this type rounds a curve, the superstructure naturally assumes an inclined or banked position, accompanied by a lowering of the center of gravity, proportioned to the centrifugal force developed in rounding the curve.

Means may be provided to progressively return the superstructure to the normal or upright position relative to the wheel supporting means as the force inducing it to move to an inclined position ceases to be effective. One desirable form of such a superstructure return mechanism consists in the provision of resilient means such for example as a spring 64 carried by the superstructure frame 2 (see Figs. 12 and 13). The spring 64 may be mounted in a housing 66 in such a manner as to be actuated by one of the arms 68 or 70 carried by the links 38 and 39 respectively depending on which way the superstructure is banked, it being noted that the arm on the outside of the curve, or on the high side of the superstructure will be operable.

Means may be provided to interconnect the front supporting links 36 and 37 with the rear supporting links 38 and 39 to insure that both ends of the superstructure will be moved to the same angularly inclined or banked position relative to the wheel supporting means.

One desirable form of such an interconnection comprises a pair of bell cranks 74 and 76 mounted at the front and rear ends of the frame 2 of the superstructure. One arm of the bell crank 74 at the front of the frame 2 may be connected by means of a shackle 78 to one of the front supporting links 36 or 37, and one arm of the bell crank 76 at the rear of the frame 2 may be connected by means of a rod 80 to one of the rear supporting links 38 or 39. The free arms of the bell cranks 74 and 76 may be interconnected by means of rods 82 and 84 extending longitudinally of the vehicle.

As the superstructure is moved to an inclined or banked position, the rod 80 connected to one of the rear supporting links 38 or 39 rotates the bell crank 76, thereby moving the rods 82 and 84 longitudinally of the frame 2 to rotate the bell crank 74 at the front of the frame 2, to move the shackle 78 laterally of the vehicle to position the front supporting links 36 and 37 at the same angle that the rear supporting links 38 and 39 are moved to.

Novel means may be provided to maintain the radius rods 48 and 50 in proper alignment to cause the front and rear wheels 8 and 10 to track. The adjacent ends of the radius rods 48 and 50 may be formed with interfitting ball and socket connections 86 and 88 as illustrated in Fig. 3 to permit limited vertical oscillatory movement of the radius rods as the wheels of the vehicle pass over uneven surfaces in the road, or the load in the superstructure or body varies, and to permit the turning movement of the superstructure relative to the superstructure supporting links. A shell 90 preferably surrounds the ball and socket connection 86 and 88.

The shell 90 may be mounted in the midportion of a transversely movable bar 92 carried by a pair of oppositely directed arms 94 and 96 hingedly connected to the frame 2. The arm 96 may form one arm of a bell crank, the other arm 98 of which is connected to the longitudinally movable rods 82 and 84.

When the superstructure or body is moved laterally to an inclined or banked position under the influence of centrifugal force, the rods 82 and 84 interconnecting the rear and front supporting links move longitudinally relative to the frame 2, thereby rotating the arms 98 and 96 of the bell crank to move the bar 92 supporting the radius rods 48 and 50 laterally relative to the frame 2 to maintain the radius rods 48 and 50 in the same position relative to the front and rear wheel supporting means 4 and 6 while the superstructure is moved to an inclined or banked position.

It will be recalled that the movement of the superstructure to an inclined or banked position is accompanied by a lowering of the center of gravity of the superstructure relative to the wheel supporting means. To avoid building the superstructure undesirably high relative to the wheel supporting means and the radius rods, it is desirable that the radius rods also move downwardly as the superstructure is moved to an inclined or banked position. Referring to Figs. 10 and 11, it will be observed that as the midsection of the bar 92 moves laterally relative to the frame 2, it also moves downwardly with the frame thereby avoiding the possibility of the frame, engine or any parts of the superstructure striking the radius rods.

It will be understood that if desired only one of the radius rods 48 or 50 may be provided and controlled by the bar 92 or equivalent structure.

Fig. 14 illustrates a modified form of the invention which is similar in many respects to that illustrated in Fig. 2, corresponding parts have therefore been given corresponding reference numerals with the addition of 100. In this embodiment, the invention is adapted for use in long vehicles such for example as busses and trucks wherein it is impractical to extend the radius rods 148 and 150 to such an extent that they could be controlled by a single bar 192. In such cases the radius rods 148 and 150 may be actuated by separate bars 192 spaced longitudinally of the vehicle, an additional longitudinally movable control rod 183 being interposed between the longitudinally movable rods 182 and 184.

Figs. 4 to 9 illustrate modified forms of the invention which are similar in many respects to that illustrated in Figs. 1 and 2, corresponding parts have therefore been given corresponding reference numerals with the addition of 100 in each of these figures.

In the embodiment of Fig. 4, the invention is adapted for use in a vehicle having a torsion suspension system wherein an axle tube 201 houses torsion rods 203 and 205. One end of each rod is fixed in opposite ends of the axle tube 201, and the free end of each rod is fixed to the oscillatable members 207 and 209 of the left and right wheel supporting spindles 211 and 213 respectively. Guide bars 215 and 217 interposed between arms 219 and 221 and the upper ends of the wheel supporting spindles 211 and 213 are provided to aid in supporting the wheel spindles. The lower ends of the superstructure supporting links 236 and 237 may be hingedly mounted in the axle tube 201. If desired this same type of suspension may also be employed at the rear end of the vehicle.

Fig. 5 shows the invention adapted for use in a vehicle having independent wheel suspension. The usual radius rods may be split longitudinally to form independently operable wheel guide members 348a and 348b, which may oscillate about the longitudinal axis C—C defined by the connection of the wheel guide members 348a and 348b at the rear and front ends. The members 348a and 348b are provided with supporting surfaces 325 and 327 to receive the coil springs 320 and have bifurcated outwardly disposed portions 327 and 329 to receive wheel supporting spindles 331 and 333.

A superstructure supporting member 335 is pivotally mounted on the axis C—C at 341 to the interconnection between the wheel guide members 348a and 348b and has upwardly and outwardly extending arms 343 which engage the top of the springs 320, and also receive one end of the links 345 and 347 which act as restraining members for the wheel supporting spindles 331 and 333. The member 335 also receives the lower ends of the angularly inclined links 336 and 337 which support the superstructure in such a manner that it may be moved to an inclined or banked position under the influence of centrifugal force developed as the vehicle rounds a curve. It would also be possible to locate a transverse leaf spring instead of the coil springs 320 between the member 335 and the wheel guide members 348a and 348b. In this arrangement, a shackle might be provided between the ends of the leaf spring and the radius rods if desired.

Attention is called to the fact that in this construction the braking and other forces are transmitted directly through the members 348a and 348b to the bar 392 carried by the frame 302 of the superstructure. If desired this same type of suspension may be employed at the rear of the vehicle.

In Fig. 6 another form of independent suspension is illustrated wherein a transverse leaf spring 416 is mounted on the forward ends of the wheel guide members 448a and 448b.

In this embodiment it will be observed that the forwardly directed longitudinally movable control rod 482 may be carried by an arm 455 carried by the arm 494 thereby positioning the control rod 482 for the front supporting links on the opposite side of the engine and superstructure than that illustrated in Figs. 1 and 2.

Fig. 7 illustrates the provision of cable control to actuate the radius rod control bar 592. In this embodiment, cables 559, 561, 563 and 565 suitably connected to the rear and front superstructure supporting links may be employed to actuate a control bar 567 to move the arm 596 to actuate the bar 592 transversely relative to the superstructure to control the radius rods as described above.

The embodiment of Fig. 8 discloses another method by which the transversely movable bar 692 may be controlled. In this embodiment the rear and front superstructure supporting links may be suitably interconnected by a rotatable rod 671 to induce equal angular movement of the supporting links at the rear and front of the vehicle. An arm 673 may be connected to the transversely movable bar 692 by means of a lever 675 whereupon the rod 692 will be moved transversely relative to the superstructure as the rod 671 is rotated during banking movements of the vehicle superstructure.

Fig. 9 embodies the provision of power actuated means to control the transversal movement of the rod 792 controlling the positioning of the radius rods. Suitable fluid pressure operated means may be employed to induce the superstructure supporting links to move together as the superstructure is moved to an inclined or banked position. This fluid pressure operated means may be employed through a suitable cylinder and piston actuated member 781 supplied with fluid through conduits 783 and 785 to actuate the arm 796 to move the rod 792 transversely to control the position of the radius rods 748 and 750.

It will be understood that any of the modified forms or features of the invention may be combined with any of the other forms or features disclosed herein as may be desired.

I claim:

1. In a vehicle having front and rear wheel supporting means, longitudinally extending connecting means between the front and rear wheel supporting means, a superstructure, front and rear connecting means comprising angularly inclined links between the wheel supporting means and superstructure whereby the superstructure may assume an angularly inclined or banked position relative to the wheel supporting means under the influence of centrifugal force, means interconnecting the front and rear links to induce them to move in unison, and means actuated by movement of said links to control the longitudinally extending connecting means between the front and rear wheel supporting means.

2. In a vehicle having front and rear wheel supporting means, connecting means between the front and rear wheel supporting means, a superstructure, front and rear connecting means including angularly inclined links between the wheel supporting means and superstructure whereby the superstructure may assume an angularly inclined or banked position relative to the wheel supporting means under the influence of centrifugal force, means interconnecting the front and rear links to induce them to move in unison, and means carried by the superstructure and actuated by movement of said links to maintain the front and rear wheel supporting means in the same relative position in a horizontal plane regardless of angular variations between the superstructure and the wheel supporting means.

3. A vehicle comprising front and rear wheel supporting means, means comprising radius rods interposed between the wheel supporting means to maintain them in substantially fixed transverse relation relative to each other, a superstructure, connecting means between the superstructure and wheel supporting means whereby the superstructure may assume an inclined position relative to the wheel supporting means accompanied by lateral and downward movement of the superstructure under the influence of centrifugal force, and transversely movable means operably connected to the radius rods and actuated as the superstructure moves to an inclined position to maintain said radius rods in said substantially fixed transverse relation relative to each other.

4. A vehicle comprising front and rear wheel supporting means, means comprising radius rods interposed between the wheel supporting means to maintain them in substantially fixed transverse relation relative to each other, a superstructure, connecting means comprising angularly inclined links interposed between the superstructure and wheel supporting means whereby the superstructure may assume an inclined position relative to the wheel supporting means accompanied by lateral and downward movement of the superstructure under the influence of centrifugal force, and transversely movable means carried by the superstructure and operably connected to the radius rods and controlled by movement of said links to move the radius rods and superstructure laterally one relatively to the other.

5. In a vehicle having front and rear wheel supporting means comprising axles, resilient means and transversely extending members carried by the resilient means, connecting means between the front and rear wheel axles, a superstructure having a normal upright position, front and rear connecting means between the transversely extending members and superstructure whereby the superstructure may assume an angularly inclined or banked position relative to the transversely extending members under the influence of centrifugal force, motion transmitting means interconnecting the front and rear connecting means between the transversely extending members and superstructure to induce them to move in unison, means carried by the superstructure and actuated by the motion transmitting means to maintain the front and rear axles in the same relative position laterally regardless of angular variations between the superstructure and the transversely extending members, and resilient means associated with one of the last named means to return the superstructure.

6. A vehicle comprising wheel supporting means, resilient means mounted on the wheel supporting means, a member engaging the resilient means, a superstructure, connecting means between the superstructure and said member whereby the superstructure may assume an inclined or banked position relative to said member as the vehicle is subjected to centrifugal forces, motion transmitting means associated with the superstructure to maintain the wheel supporting means in a substantially fixed lateral relation, and means operated as the superstructure moves to an inclined or banked position to move the motion transmitting means to maintain the wheel supporting means in said substantially fixed relation.

7. A vehicle comprising front and rear wheel supporting means, resilient means associated with the wheel supporting means, a member engaging the resilient means, a superstructure, connecting means including angularly inclined links interposed between the superstructure and said member whereby the superstructure may assume an inclined or banked position relative to said member as the vehicle is subjected to centrifugal forces, longitudinally extending means associated with the superstructure to maintain the front and rear wheel supporting means in a substantially fixed lateral relation relative to each other, and means comprising a transversely movable bar hingedly mounted on the superstructure and operated as the superstructure moves to an inclined or banked position to move the longitudinally extending means to maintain the front and rear wheel supporting means in said substantially fixed relation.

8. A vehicle comprising wheel supporting means, a superstructure, connecting means between the superstructure and the wheel supporting means whereby the superstructure may assume an inclined or banked position relative to the wheel supporting means as the vehicle is subjected to centrifugal forces, means including radius rods associated with the wheel supporting means and movably connected to the superstructure to maintain the wheel supporting means within a substantially predetermined range of movement and transversely movable means carried by the superstructure operably connected to the radius rods and operable in proportion to movement of the superstructure to an inclined or banked position to relatively move the radius rods and superstructure to maintain the wheel supporting means within said substantially predetermined range of movement.

9. A vehicle comprising front and rear wheel supporting means, means including radius rods interconnecting the front and rear wheel supporting means, a superstructure carried by the wheel supporting means and adapted to assume an inclined or banked position under the influence of centrifugal force, and means comprising a transversely movable bar operably connected to the radius rods and oppositely directed arms hingedly connected to the superstructure at longitudinally spaced points and to said bar to maintain the radius rods at substantially the same angular relation in a horizontal plane when the superstructure assumes an inclined or banked position.

10. A vehicle comprising wheel supporting means at each end thereof, means including a radius rod fixed to one of the wheel supporting means, a superstructure carried by said wheel supporting means and adapted to assume an inclined or banked position relative thereto under the influence of centrifugal force, and means comprising a transversely movable bar operably connected to said radius rod and oppositely directed arms hingedly connected to the superstructure at longitudinally spaced points and to said bar to maintain one of the wheel supporting means in a substantially fixed relation with respect to the other in a horizontal plane when the superstructure assumes an inclined or banked position.

11. In a vehicle having front and rear wheel supporting means, connecting means including radius rods between the front and rear wheel supporting means, a superstructure, front and rear connecting means including paired angularly inclined links between the wheel supporting means and superstructure whereby the superstructure may assume an angularly inclined or banked position relative to the wheel supporting means under the influence of centrifugal force, means comprising bell cranks and a longitudinally movable rod interconnecting the front and rear links to induce them to move in unison, and means comprising a transversely movable bar operably connected to the radius rods and carried by oppositely movable elements hingedly connected to the superstructure and said rod to maintain the radius rods in a substantially fixed relation relative to each other in a horizontal plane when the superstructure assumes an inclined or banked position.

12. In a vehicle having front and rear wheel supporting means comprising independent resilient axle assemblies whereby any wheel may move independently of another to resiliently absorb vertical impulses, guiding elements associated with the wheel supporting means, a transversely extending member carried by the wheel supporting means, a superstructure having a normal upright position, connecting means between the transversely extending member and superstructure whereby the superstructure may assume an angularly inclined or banked position relative to the transversely extending member under the influence of centrifugal force, and means carried by the superstructure and actuated by movement of the superstructure to an inclined or banked position to maintain the guiding elements in the same relative position in a horizontal plane regardless of angular variations between the superstructure and the transversely extending member.

13. In a vehicle having front and rear wheel supporting means comprising independent resilient axle assemblies whereby any wheel may move independent of another to resiliently absorb vertical impulses, guiding elements associated with the wheel supporting means, transversely extending members carried by the front and rear wheel supporting means, a superstructure having a normal upright position, front and rear connecting means comprising angularly inclined links interposed between the transversely extending members and superstructure whereby the superstructure may assume an angularly inclined or banked position relative to the transversely extending members under the influence of centrifugal force, means comprising a member movable longitudinally of the vehicle and operably connected to said links to induce the links to move in unison, and means comprising a bar and oppositely disposed arms interconnecting the bar and superstructure and actuated by longitudinal movement of said member to maintain the front and rear guiding elements in substantially the same relative position to each other in a horizontal plane regardless of angular variations between the superstructure and said transversely extending members.

14. A vehicle comprising front and rear wheel supporting means including generally transversely extending members, a superstructure having a normal upright position, connecting means including paired angularly inclined links interconnecting said generally transversely extending members and superstructure whereby the superstructure may assume an inclined or banked position under the influence of centrifugal force, guiding means comprising oppositely directed longitudinally extending radius rods interconnecting the wheel supporting means, and connecting means between the radius rods and the superstructure comprising oppositely directed arms hingedly mounted on the superstructure and a transversely movable bar carried by said arms and engaging said radius rods.

15. A vehicle comprising front and rear wheel supporting means including generally transversely extending members, a superstructure having a normal upright position, connecting means including paired angularly inclined links interconnecting said generally transversely extending members and superstructure whereby the superstructure may assume an inclined or banked position under the influence of centrifugal force, connecting means including a member movable longitudinally of the vehicle interconnecting the front and rear links to induce them to move in unison, guiding means for the wheel supporting means, and connecting means between the guiding means and the superstructure comprising oppositely directed arms hingedly mounted on the superstructure, a bar carried by said arms and engaging said guiding means and connecting means between one of the arms and said longitudinally movable member.

16. In a vehicle having front and rear wheel supporting means, connecting means between the front and rear wheel supporting means whereby they maintain a substantially fixed relation relative to each other in a horizontal plane, a superstructure, front and rear angularly inclined link means interconnecting the wheel supporting means and superstructure whereby the superstructure may assume an inclined position when subjected to centrifugal force, a pair of bell cranks hingedly mounted on the superstructure intermediate the link means and having arms extending longitudinally of the vehicle in opposite directions and arms extending transversely of the vehicle, a transversely movable bar supporting said connecting means and carried by said oppositely extending arms, and means interconnecting said transversely extending arms and the front and rear link means.

17. In a vehicle having front and rear wheel supporting means, guiding elements interconnecting the front and rear wheel supporting means whereby they maintain a substantially fixed relation relative to each other in a horizontal plane, a superstructure, front and rear angularly inclined link means interconnecting the wheel supporting means and superstructure whereby the superstructure may assume an inclined position when subjected to centrifugal force, a bell crank and an arm hingedly mounted on the superstructure intermediate the link means whereby said arm and an arm of the bell crank extend longitudinally of the vehicle in opposite directions, the other arm of the bell crank extending transversely of the vehicle, a transversely movable bar supporting said guiding elements and carried by oppositely extending arms, and motion transmitting means interconnecting said transversely extending arm and the front and rear link means.

18. In a vehicle having wheel supporting means including front and rear generally transversely extending members, a superstructure, front and rear connecting means between the transversely extending members and superstructure whereby the superstructure may assume an inclined position relative to said members as the vehicle is subjected to centrifugal force, motion transmitting means between the front and rear connecting means to induce them to move in unison, guiding means for the wheel supporting means whereby each wheel may oscillate vertically about an axis longitudinally of the vehicle, connecting means between the guiding means and the superstructure whereby the guiding means and the wheel supporting means will maintain a substantially constant relation relative to each other in a horizontal plane as the superstructure moves to an inclined position, and means interconnecting the guiding means with the motion transmitting means.

19. In a vehicle having wheel supporting means including front and rear generally transversely extending members, a superstructure, front and rear connecting means between the transversely extending members and superstructure whereby the superstructure may assume an inclined position relative to said members as the vehicle is subjected to centrifugal force, motion transmitting means between the front and rear connecting means to induce them to move in unison, guiding means for the wheel supporting means whereby each wheel may oscillate vertically about an axis longitudinally of the vehicle, connecting means comprising oppositely directed arms hingedly connected to the superstructure and a transversely movable bar carried by said arms and engaging the guiding means whereby the guiding means and the wheel supporting means will maintain a substantially constant relation relative to each other in a horizontal plane as the superstructure moves to an inclined position, and means comprising transversely extending members carried by one of said arms and a plurality of cables interconnecting the guiding means with the motion transmitting means.

20. In a vehicle having wheel supporting means including front and rear generally transversely extending members, a superstructure, front and rear connecting means between the transversely extending members and superstructure whereby the superstructure may assume an inclined position relative to said members as the vehicle is subjected to centrifugal force, fluid pressure actuated motion transmitting means between the front and rear connecting means to induce them to move in unison, guiding means for the wheel supporting means whereby each wheel may oscillate vertically about an axis longitudinally of the vehicle, connecting means comprising oppositely directed arms hingedly connected to the superstructure and a transversely movable bar carried by said arms and engaging the guiding means whereby the guiding means and the wheel supporting means will maintain a substantially constant relation relative to each other in a horizontal plane as the superstructure moves to an inclined position, and fluid pressure actuated means interconnecting the guiding means with the fluid pressure actuated motion transmitting means.

21. A vehicle comprising front and rear wheel supporting means including rigid axles, guiding means including radius rods fixed to the axles and having free ends extending longitudinally of the vehicle in opposite directions, front and rear generally transversely extending members, resilient means interposed between the transversely extending members and radius rods, a superstructure, connection means between the transversely extending members and superstructure whereby the superstructure may assume an inclined position when subjected to centrifugal force, and means carried by the superstructure engaging the free ends of the radius rods and actuated by movement of the superstructure to an inclined position to maintain the radius rods in a substantially fixed relation relative to each other in a horizontal plane as the superstructure moves to an inclined position.

22. A vehicle comprising wheel supporting means including guiding means adapted to receive the wheels and having angularly and transversely inclined segments pivotally mounted longitudinally of the vehicle, generally transversely extending members, resilient means interposed between the transversely extending members and guiding means, a superstructure, connecting means between the transversely extending members and superstructure whereby the superstructure may assume an inclined position when subjected to centrifugal force, and means carried by the superstructure engaging the angularly inclined segments of the guiding means and actuated by movement of the superstructure to an inclined position to maintain the guiding means at substantially the same angular relation in a horizontal plane as the superstructure moves to an inclined position.

JOACHIM KOLBE.